United States Patent
Hou (10) Patent No.: US 7,926,182 B2
(45) Date of Patent: Apr. 19, 2011

(54) METHOD FOR MANUFACTURING HYDRODYNAMIC BEARINGS

(75) Inventor: Chuen-Shu Hou, Taipei Hsien (TW)

(73) Assignee: Foxconn Technology Co., Ltd., Tu-Cheng, New Taipei (TW)

(*) Notice: Subject to any disclaimer, the term of this patent is extended or adjusted under 35 U.S.C. 154(b) by 1062 days.

(21) Appl. No.: 11/690,020

(22) Filed: Mar. 22, 2007

(65) Prior Publication Data
US 2008/0168655 A1     Jul. 17, 2008

(30) Foreign Application Priority Data

Jan. 17, 2007   (CN) .......................... 2007 1 0072865

(51) Int. Cl.
*B21D 53/10* (2006.01)
(52) U.S. Cl. ............... 29/898.02; 29/898.1; 29/898.12; 29/898.13; 29/898.14; 29/898.15; 264/610; 264/635; 264/645; 264/656; 264/636
(58) Field of Classification Search ............... 29/898, 29/898.02, 898.1, 898.12, 898.13, 898.14, 29/898.15; 264/610, 635, 636, 637, 645, 264/656, 657, 670
See application file for complete search history.

(56) References Cited

U.S. PATENT DOCUMENTS

| 5,018,880 | A   |   | 5/1991  | Nakasugi et al. |              |
|-----------|-----|---|---------|-----------------|--------------|
| 5,723,083 | A   | * | 3/1998  | Bogan, Jr. et al. | 264/177.11 |
| 6,105,250 | A   | * | 8/2000  | Tanaka et al.   | 29/898.02    |
| 7,146,733 | B2  | * | 12/2006 | Yamashita et al. | 29/898.02   |
| 7,309,229 | B2  | * | 12/2007 | Ueda et al.     | 425/577      |
| 7,563,030 | B2  | * | 7/2009  | Hong et al.     | 384/100      |
| 2003/0062660 | A1 | * | 4/2003 | Beard et al.   | 264/645      |

FOREIGN PATENT DOCUMENTS
| CN | 100370158 C  | 2/2008  |
| JP | 2006275077 A | 10/2006 |
| WO | 2006123602 A1 | 11/2006 |

* cited by examiner

*Primary Examiner* — David P Bryant
*Assistant Examiner* — Sarang Afzali
(74) *Attorney, Agent, or Firm* — Jeffrey T. Knapp (57) ABSTRACT

A method for manufacturing a hydrodynamic bearing with hydrodynamic pressure generating grooves comprises steps of: step 201: providing a substrate with a first annular protrusion and a plurality of projections formed on a periphery thereof, the projections being in a side of the first annular protrusion; step 202: placing the substrate in a middle of a hollow mold, then injecting a feedstock of powder and molten binder under pressure into the mold to surround the substrate, thus forming a desired bearing preform; step 203: separating the substrate from the bearing preform by means of catalytic debinding; step 204: separating the molten binder from the bearing preform; step 205: sintering the bearing preform to thereby form the hydrodynamic bearing.

20 Claims, 15 Drawing Sheets

METHOD FOR MANUFACTURING HYDRODYNAMIC BEARINGS

CROSS-REFERENCE TO RELATED APPLICATION

This application is related to U.S. patent application Ser. No. 11/627,566 filed on Jan. 26, 2007 and entitled "METHOD FOR MANUFACTURING HYDRODYNAMIC BEARING AND SHAFT"; the co-pending U.S. patent application is assigned to the same assignee as the instant application. The disclosure of the above-identified application is incorporated herein by reference.

BACKGROUND OF THE INVENTION

1. Field of the Invention

The present invention relates generally to a bearing and a shaft, and more particularly to a method for manufacturing the bearing with hydrodynamic pressure generating grooves.

2. Description of Related Art

At present, hydrodynamic bearings are widely used in spindle motors in devices, such as compact disc (CD) drivers, digital video disc (DVD) drivers, hard disk drivers, laser beam printers, floppy disk drivers or in heat-dissipation fans. Spindle motors require a hydrodynamic bearing of small size, high rotational accuracy and with a long operating life.

A typical hydrodynamic bearing defines a bearing hole therein. A shaft is rotatably received in the bearing hole. A plurality of herringbone-shaped grooves are defined either in an inner circumferential surface of the bearing or in an external circumferential surface of the shaft. The grooves can accommodate lubricants such as oil. During rotation of the shaft, the lubricant is driven by the rotation of the shaft to rotate with the shaft. A lubricating film is thus formed in a clearance between the external circumferential surface of the shaft and the inner circumferential surface of the bearing. The shaft is thus supported by hydrodynamic shearing stress and dynamic pressure generated by the lubricating film when the lubricant flows through different cross-sections. However, lubricant retention and air elimination are problems in related hydrodynamic bearing devices. The lubricant is inclined to leak out because of pumping action in the hydrodynamic bearing. Accordingly, the hydrodynamic bearing cannot work normally due to lack of the lubricant. In addition, it is hard to expel air if it becomes trapped in the hydrodynamic bearing during, for example, manufacturing. Trapped air can thus cause difficulties in assembly of the related hydrodynamic bearings.

U.S. Pat. No. 5,018,880 discloses a method for defining an oil retaining groove to solve the lubricant retention and air elimination problems of the related hydrodynamic bearing. However, the small size of the hydrodynamic bearing results in difficulties particularly in the making of the oil retaining groove therein. This makes manufacturing of the hydrodynamic bearing both time-consuming and expensive. Therefore, the related method is not suitable for mass-production of the hydrodynamic bearing.

It is therefore desirable to provide an improved method for mass-production of a hydrodynamic with good functions for lubricant retention and air expelling.

SUMMARY OF THE INVENTION

A method for manufacturing a hydrodynamic bearing with hydrodynamic pressure generating grooves comprises steps of: 1: providing a substrate with a first annular protrusion and a plurality of projections formed on a periphery thereof, the projections being in a side of the first annular protrusion; 2: placing the substrate in a middle of a hollow mold, then injecting a feedstock of powder and molten binder under pressure into the mold to surround the substrate, thus forming a desired bearing preform; 3: separating the substrate from the bearing preform by means of catalytic debinding; 4: separating the molten binder from the bearing preform; 5: sintering the bearing preform to thereby form the hydrodynamic bearing.

Other advantages and novel features of the present invention will become more apparent from the following detailed description of preferred embodiment when taken in conjunction with the accompanying drawings.

BRIEF DESCRIPTION OF THE DRAWINGS

Many aspects of the present driving device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Referring to FIG. 1 to FIG. 4, a plurality of hydrodynamic bearings 100a, 100b, 100c, 100d in accordance with a preferred embodiment of the present invention are shown, each having similar configurations to the others. The bearings 100a, 100b, 100c, 100d each comprises a cylindrical body 120 and a central hole 150 defined through the body 120 along an axis thereof. Two rows of herringbone-shaped grooves 122, 124 are defined in an inner circumferential surface of the body 120 and located near two ends of the body 120 respectively. The two rows of the grooves 122, 124 are spaced from each other along the axial direction and used to provide hydrodynamic pressure. Furthermore, the bearings 100a, 100b, 100c, 100d each comprises an annular oil retaining groove 130 defined in a middle of the inner circumferential surface of the body 120. The oil retaining groove 130 is located between the row of grooves 122 and the row of grooves 124, and spaced from the rows of grooves 122, 124. The oil retaining groove 130 is used to conserve lubricant which will flow into the grooves 122, 124 when a shaft (not shown) fitted in the central hole 150 rotates. The difference between the hydrodynamic bearing 100b and the hydrodynamic bearing 100a is that the hydrodynamic bearing 100b further comprises a holding groove 140 defined on an upper side of the grooves 124. The holding groove 140 is narrower in axial length. The holding groove 140 can be used to receive the lubricant from the grooves 124 and to prevent the lubricant from leaking out of the bearing 100b when the shaft rotates. The difference between the hydrodynamic bearing 100c and the hydrodynamic bearing 100b is that the hydrodynamic bearing 100c has two similar holding grooves 140, 142 defined on an upper side of the groove 124. Accordingly, the lubricant can be held in the bearing 100c better. The difference between the hydrodynamic bearing 100d and the hydrodynamic bearing 100b is that the bearing 100d further comprises a holding groove 144 defined in a lower side of the grooves 122. The holding groove 144 has a similar configuration to the holding groove 140. The hydrodynamic bearing 100d configured by the holding grooves 140, 144 can prevent the lubricant from leaking from two ends thereof.

Figure 1:
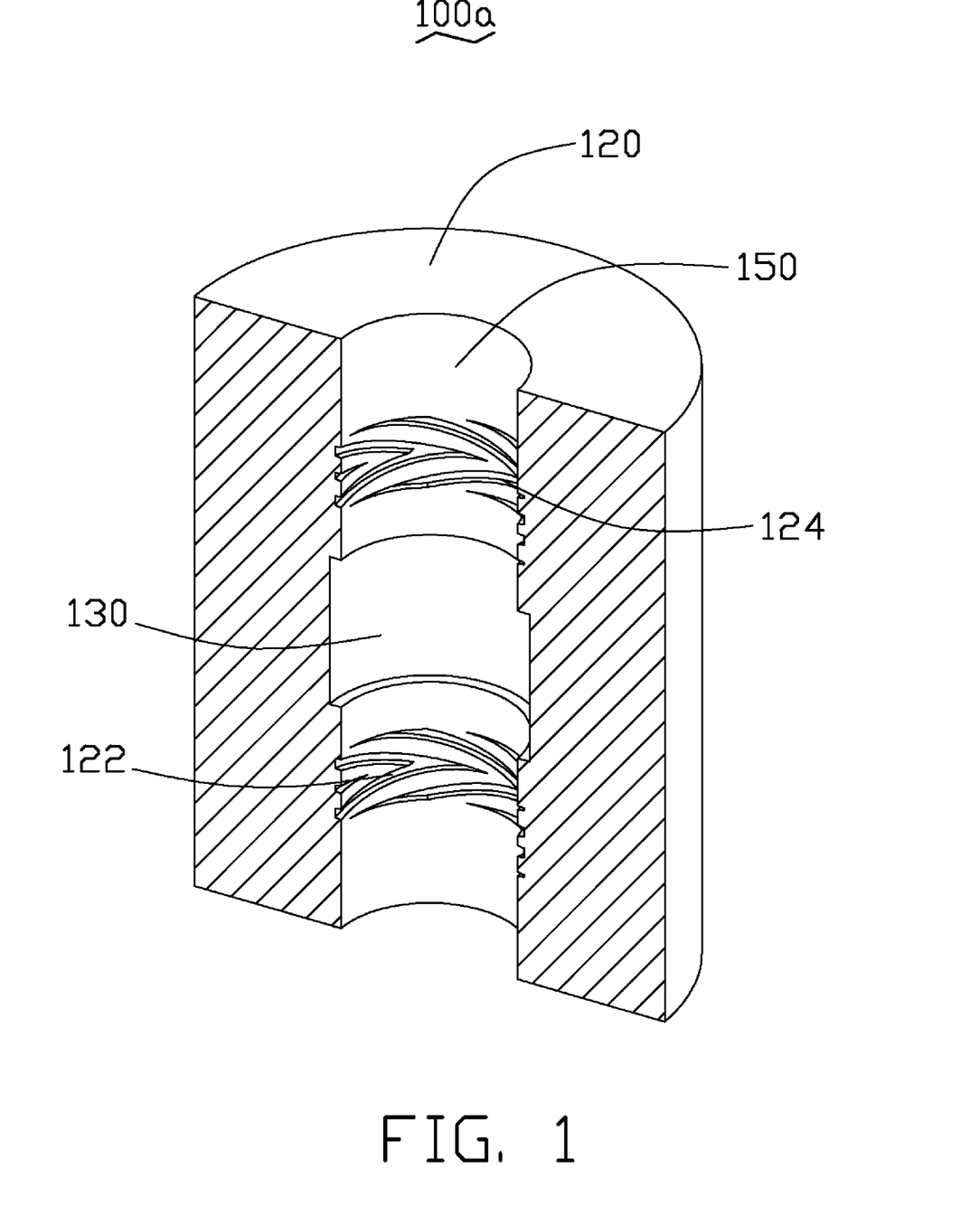
FIG. 1 is a cross-sectional, isometric view of a first hydrodynamic bearing in accordance with a preferred embodiment of the present invention.
Figure 2:
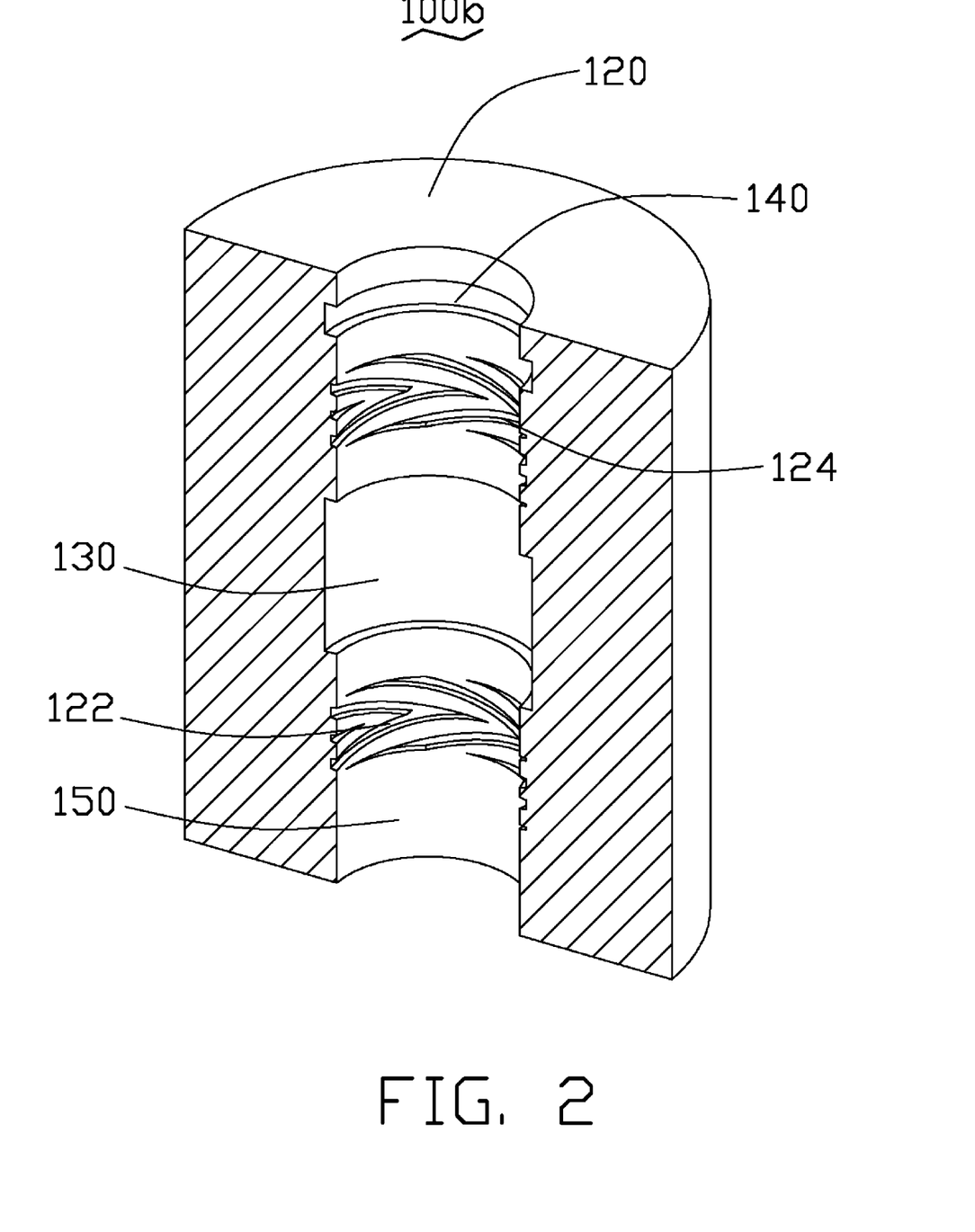
FIG. 2 is a cross-sectional, isometric view of a second hydrodynamic bearing in accordance with the preferred embodiment of the present invention.
Figure 3:
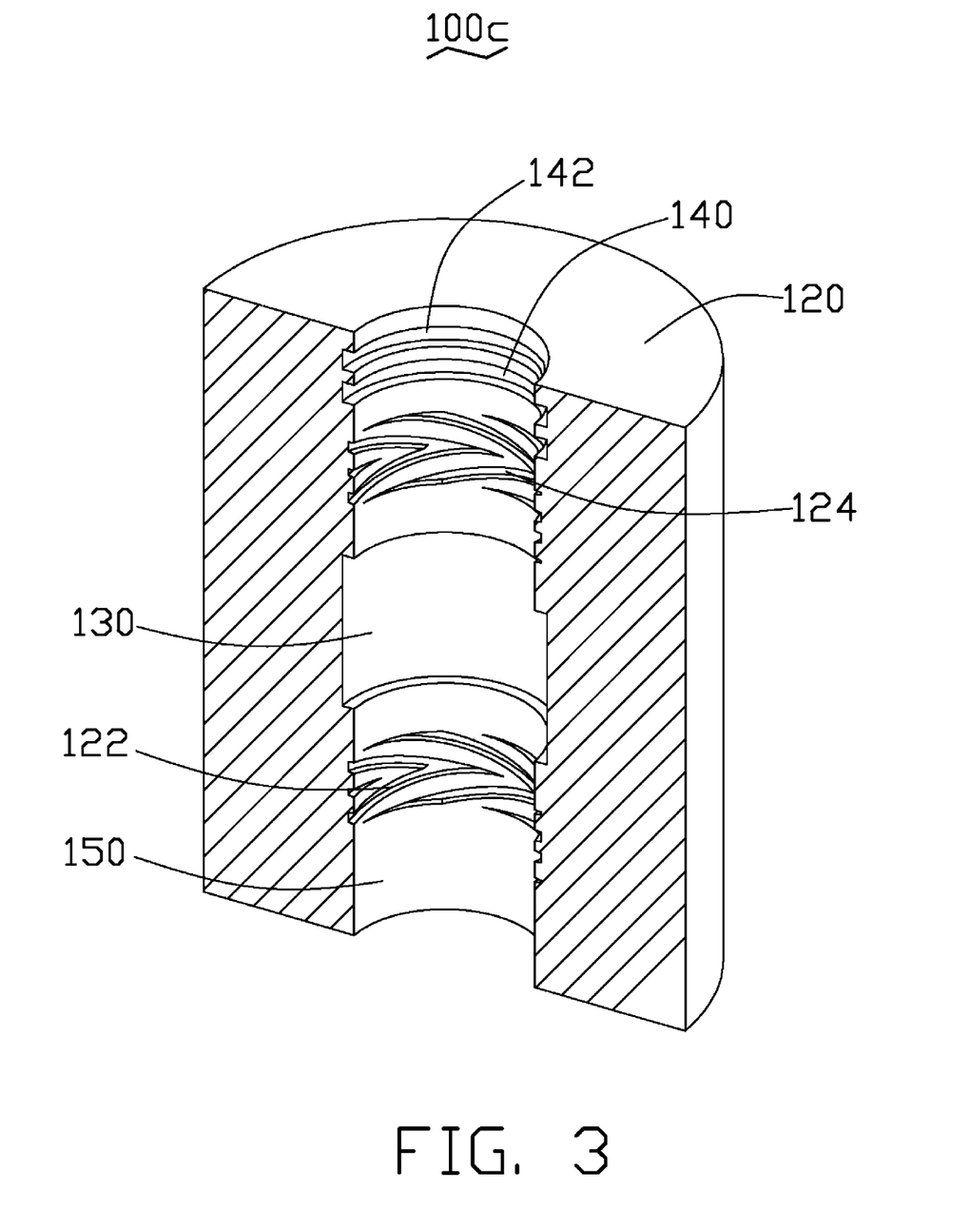
FIG. 3 is a cross-sectional, isometric view of a third hydrodynamic bearing in accordance with the preferred embodiment of the present invention.
Figure 4:
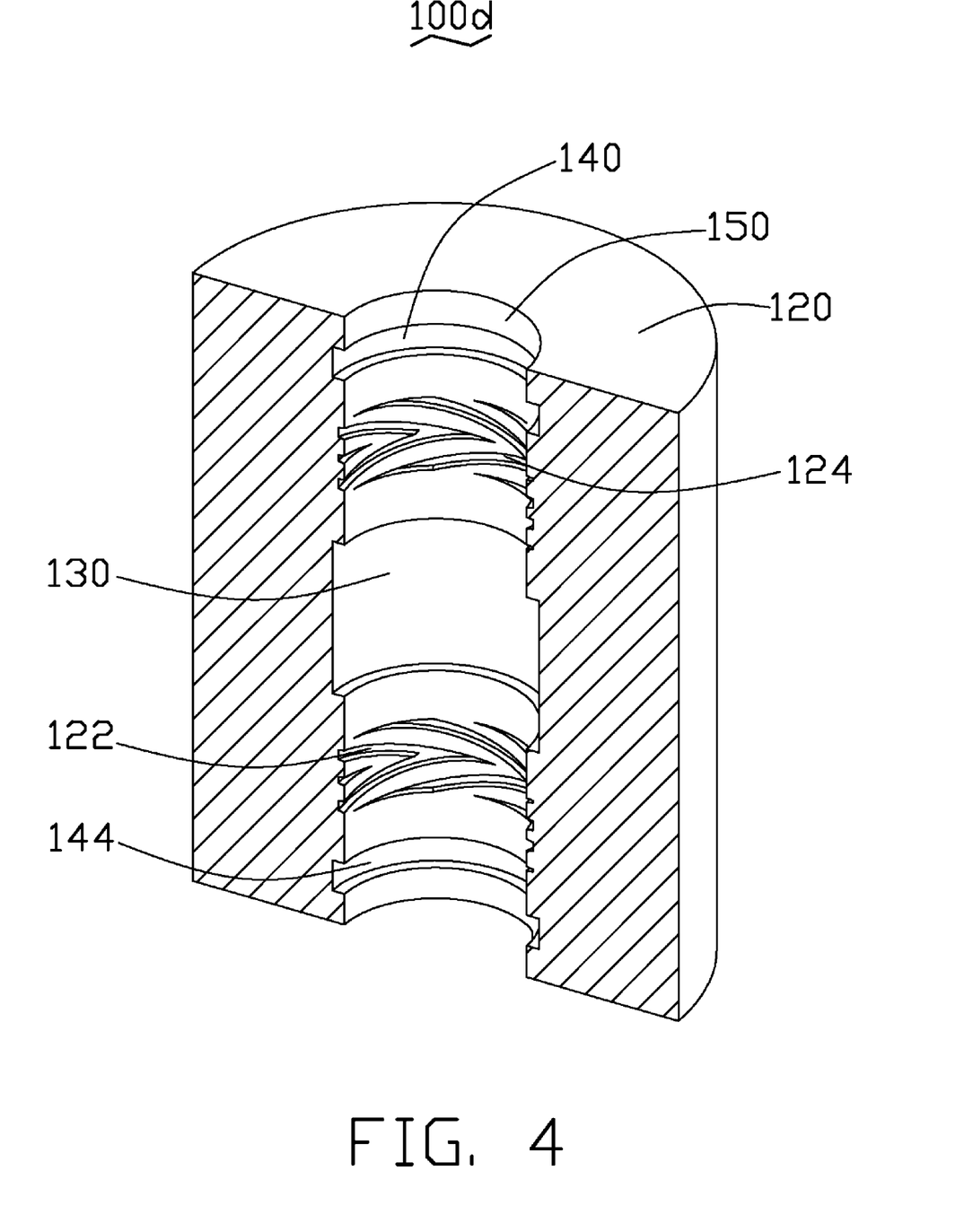
FIG. 4 is a cross-sectional, isometric view of a fourth hydrodynamic bearing in accordance with the preferred embodiment of the present invention.
Figure 5:
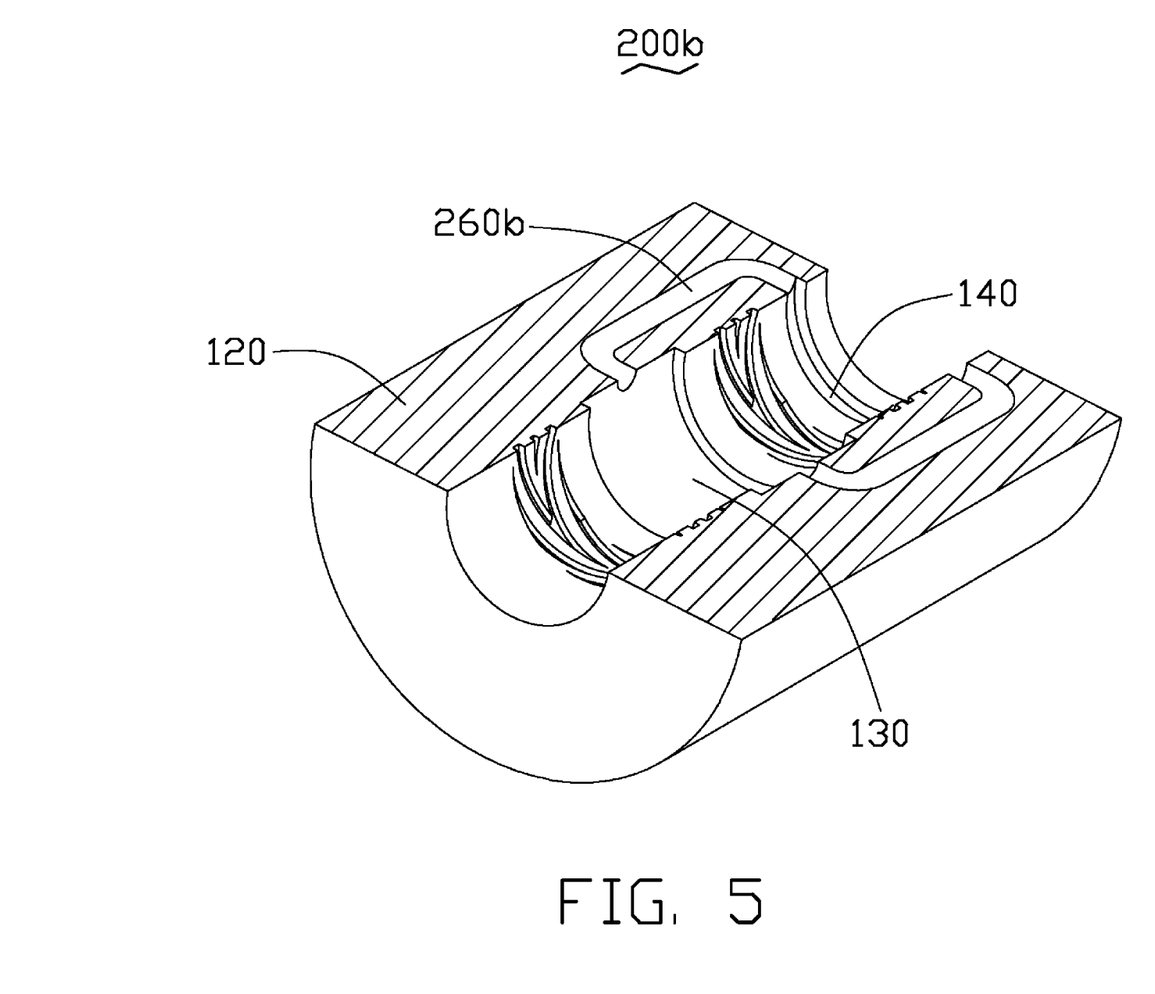
FIG. 5 is a cross-sectional, isometric view of a first hydrodynamic bearing in accordance with a second embodiment of the present invention.
Figure 6:
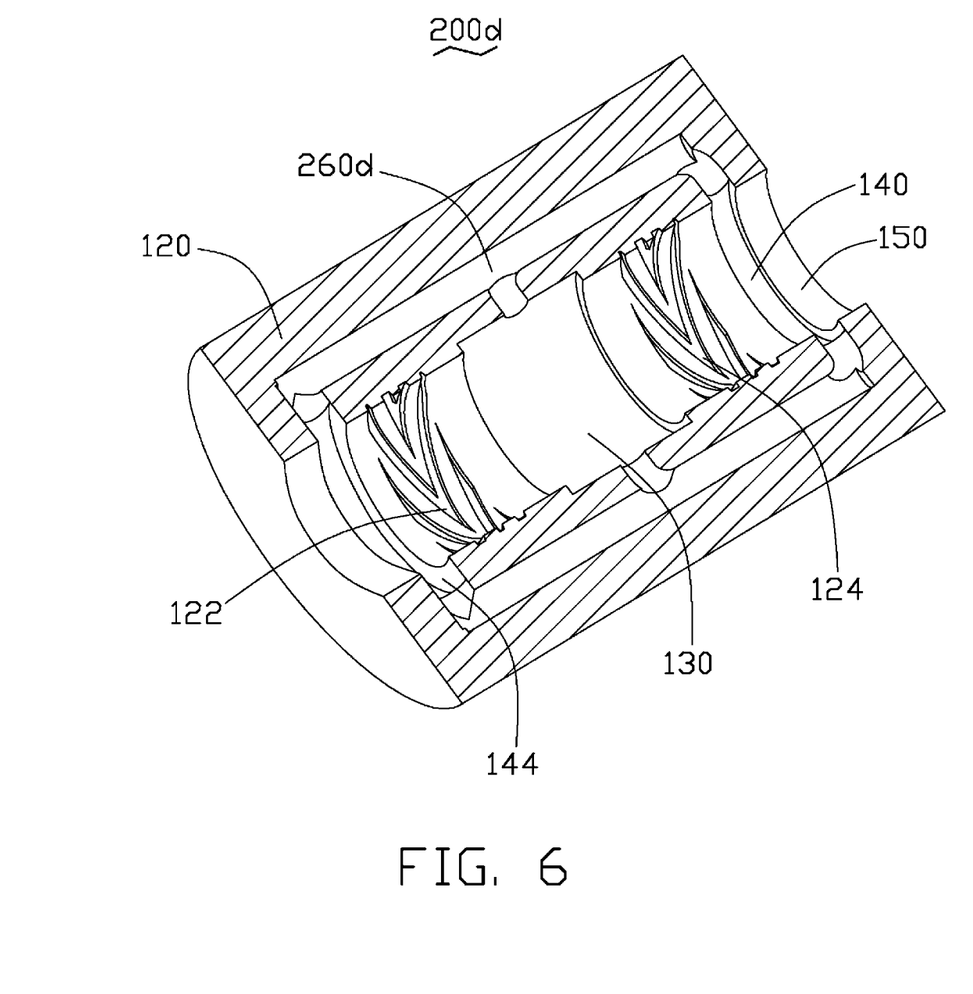
FIG. 6 is a cross-sectional, isometric view of a second hydrodynamic bearing in accordance with the second embodiment of the present invention.

Referring to FIG. 5 and FIG. 6, a plurality of hydrodynamic bearings 200b, 200d in accordance with a second embodiment of the present invention have similar configurations to the hydrodynamic bearing 100b, 100d respectively. The difference between the hydrodynamic bearing 200b and the hydrodynamic bearing 100b is that the hydrodynamic bearing 200b further comprises two conduction channels 260b defined through the body 120 and located at two sides of the central hole 150 respectively. The conduction channels 260b communicate the oil retaining groove 130 with the holding groove 140. The difference between the hydrodynamic bearing 200d and the hydrodynamic bearing 100d is that the hydrodynamic bearing 200d has two conduction channels 260d defined through the body 120 and located at two sides of the central hole 150 respectively. The two conduction channels 260d communicate the oil retaining groove 130 with the holding grooves 140, 144. Thus, in the hydrodynamic bearing 200b, 200d, the lubricant can flow among the oil retaining groove 130 and the holding grooves 140, 144 through the conduction channels 260b, 260d so that the lubricant can be conserved and used more efficiently.

As described above, the lubricant of the hydrodynamic bearing 100a, 100b, 100c, 100d, 200b, 200d is conserved and used well by means of defining a plurality of the oil retaining grooves 130, the holding grooves 140, 142, 144 and the conduction channels 260b, 260d.

Figure 7:
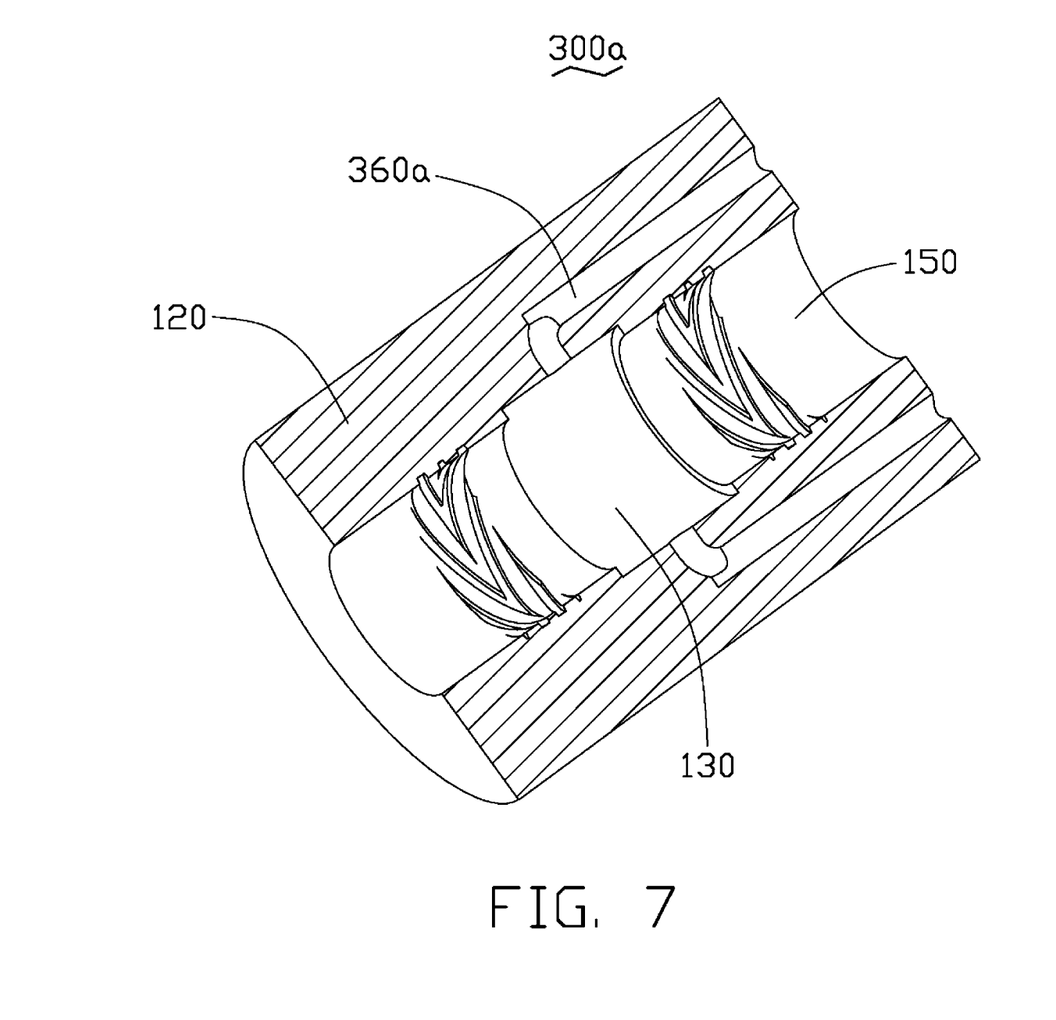
FIG. 7 is a cross-sectional, isometric view of a first hydrodynamic bearing in accordance with a third embodiment of the present invention.
Figure 8:
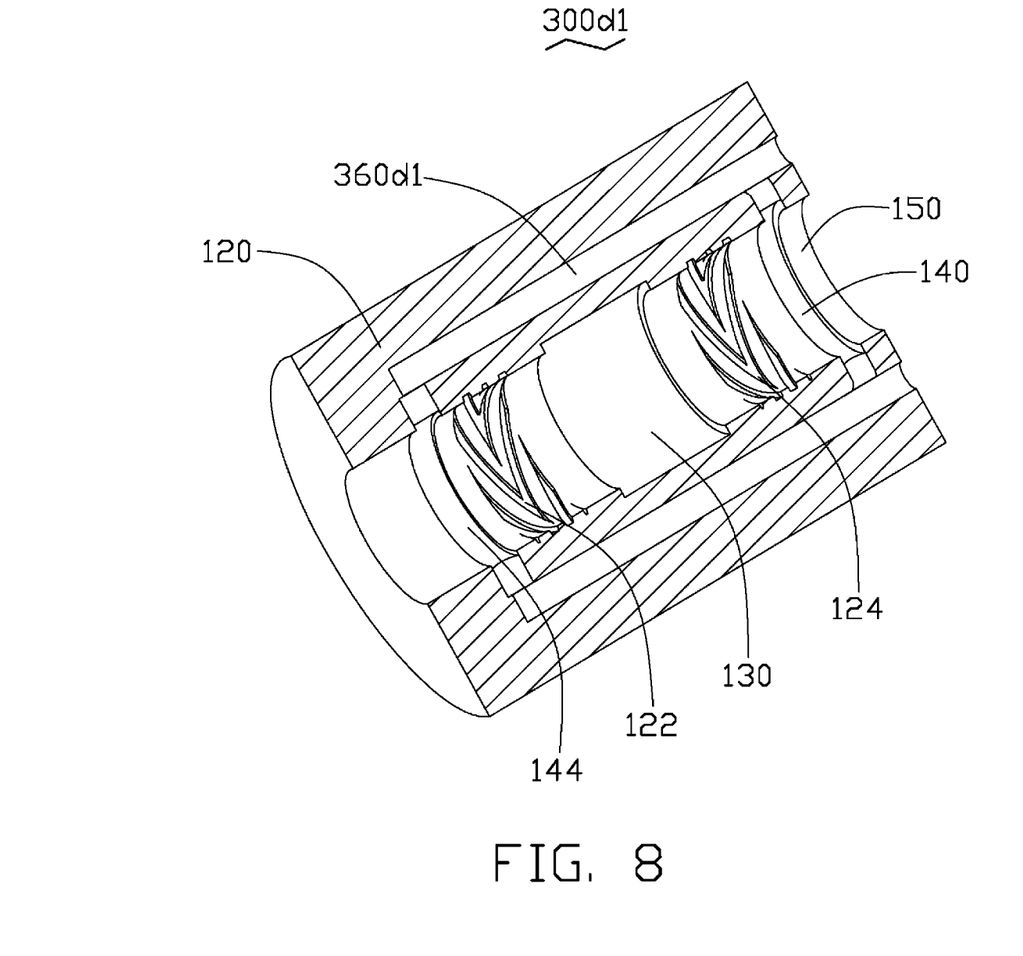
FIG. 8 is a cross-sectional, isometric view of a second hydrodynamic bearing in accordance with the third embodiment of the present invention.
Figure 9:
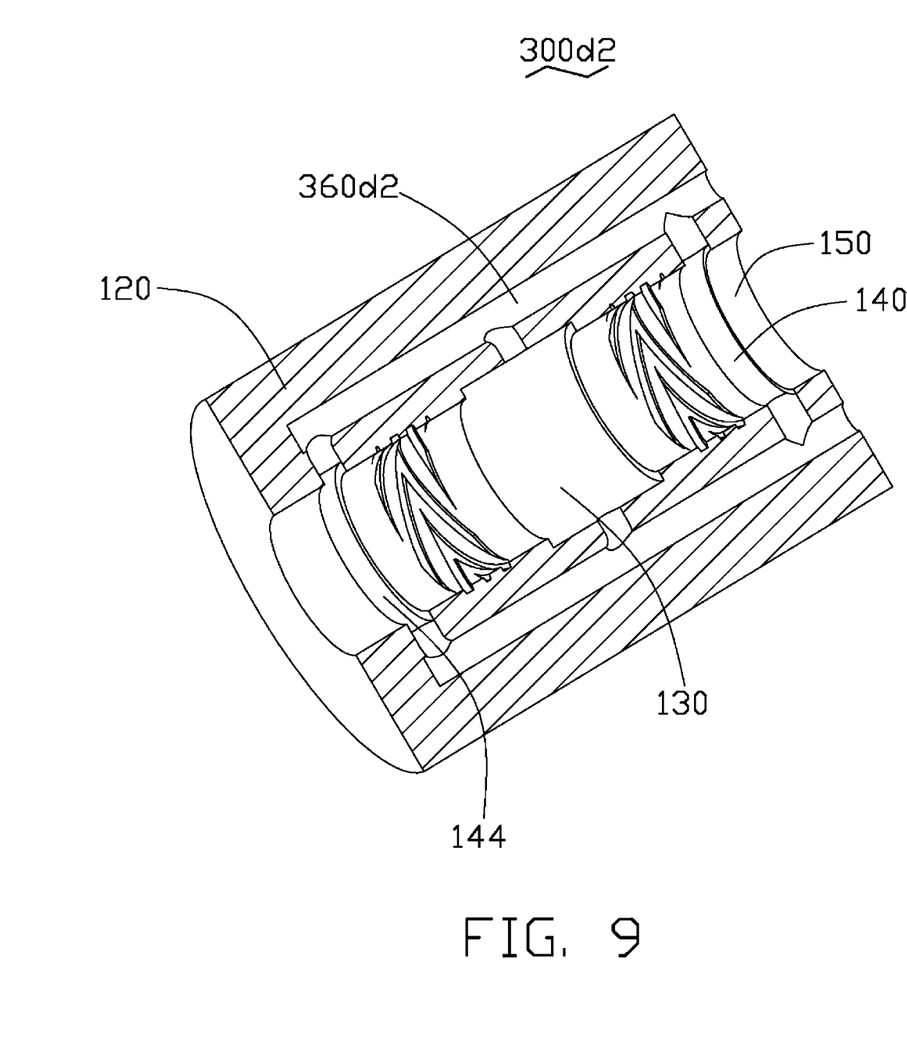
FIG. 9 is a cross-sectional, isometric view of a third hydrodynamic bearing in accordance with the third embodiment of the present invention.

Referring to FIG. 7 to FIG. 9, a plurality of hydrodynamic bearing 300a, 300d1, 300d2 in accordance with a third embodiment of the present invention have similar configurations to the hydrodynamic bearing 100a, 100d. The difference between the hydrodynamic bearing 300a and the hydrodynamic bearing 100a is that the hydrodynamic bearing 300a further comprises two air expelling channels 360a defined through the body 120 and located at two sides of the central hole 150 respectively. An end of each of the air expelling channels 360a is open to the oil retaining grooves 130 and another end of each air expelling channel 360a reaches an end of the body 120 along an axial direction of the hydrodynamic bearing 300a as opening to outside. The hydrodynamic bearing 300d1, 300d2 have similar configurations to the hydrodynamic bearing 100d. The difference is that compared with the bearing 100d, the hydrodynamic bearing 300d1 further comprises two air expelling channels 360d1 through the body 120 and located at two sides of the central hole 150 respectively. The air expelling channels 360d1 connect the holding grooves 140, 144 with the outside of the hydrodynamic bearing 300d1. Compared with the bearing 100d, the hydrodynamic bearing 300d2 further comprises two air expelling channels 360d2. The air expelling channels 360d2 connect the holding grooves 140, 144 and the oil retaining groove 130 with the outside of the hydrodynamic bearing 300d2.

During assembly of the shaft and the hydrodynamic bearing 300a, 300d1 or 300d2, air remaining in the body 120 can be expelled to the outside through the air expelling channels 360a, 360d1 or 360d2. Furthermore, the lubricant can be injected into the oil retaining groove 130, the holding grooves 140, 144 through the air expelling channel 360a, 360d1 or 360d2 after the shaft is mounted to the hydrodynamic bearing 300a, 300d1 or 300d2.

Figure 10:
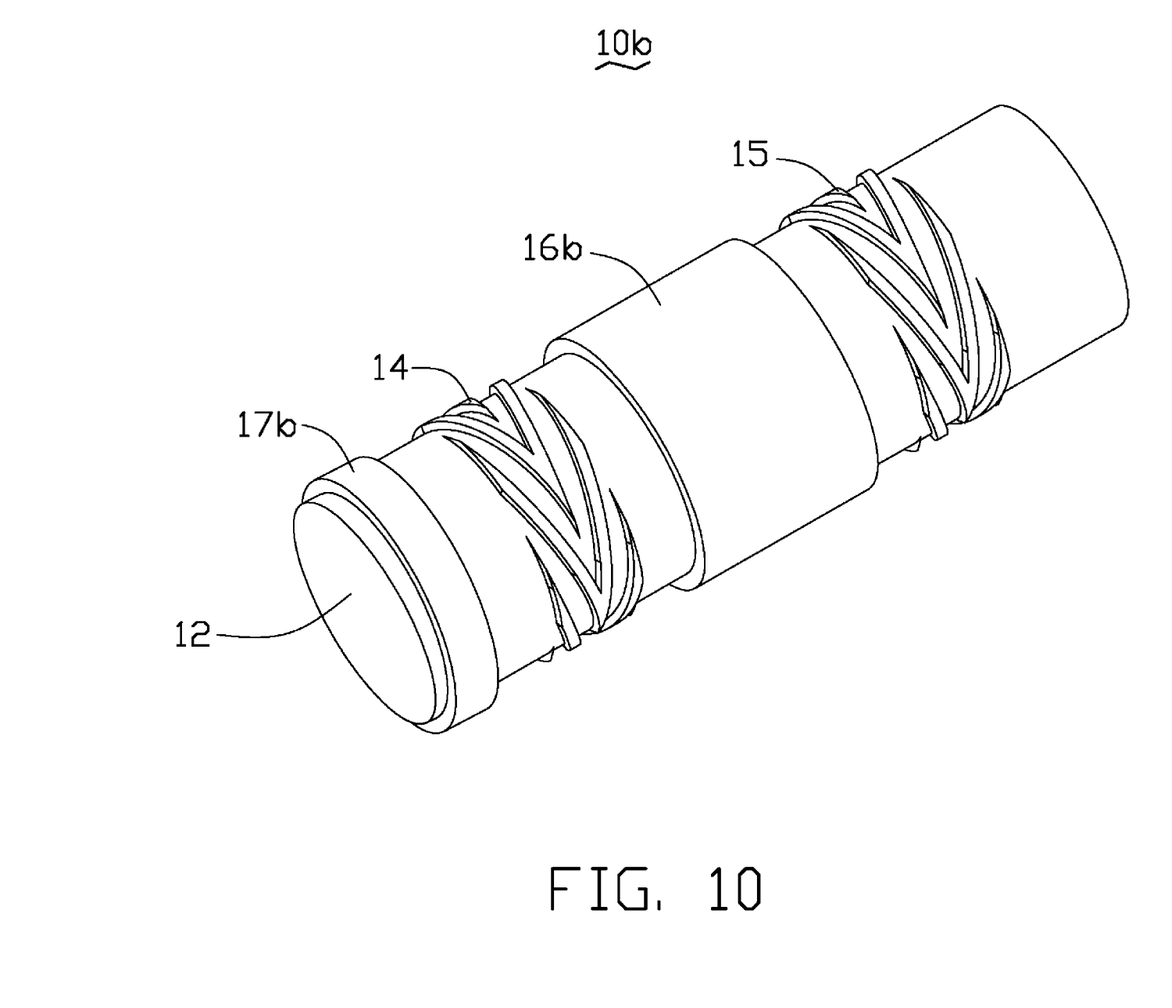
FIG. 10 is an isometric view of a substrate in accordance with the preferred embodiment of the present invention.
Figure 11:
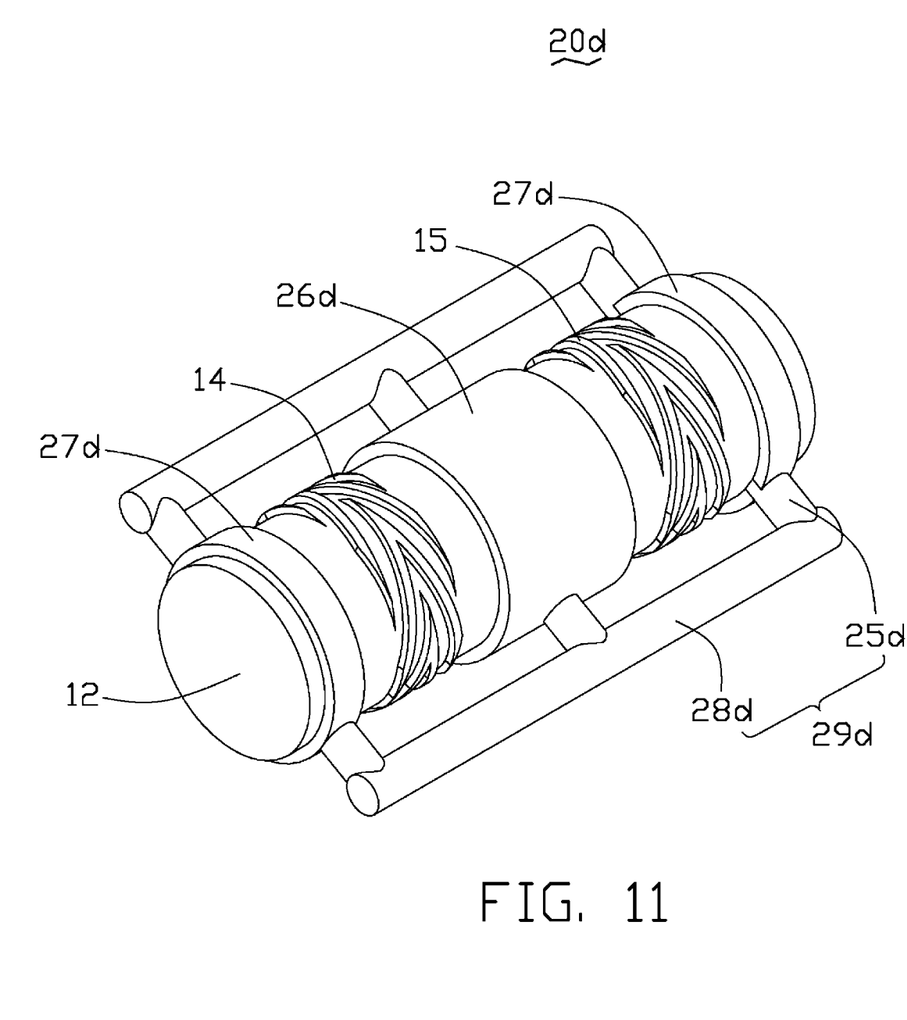
FIG. 11 is an isometric view of a substrate in accordance with the second embodiment of the present invention.
Figure 12:
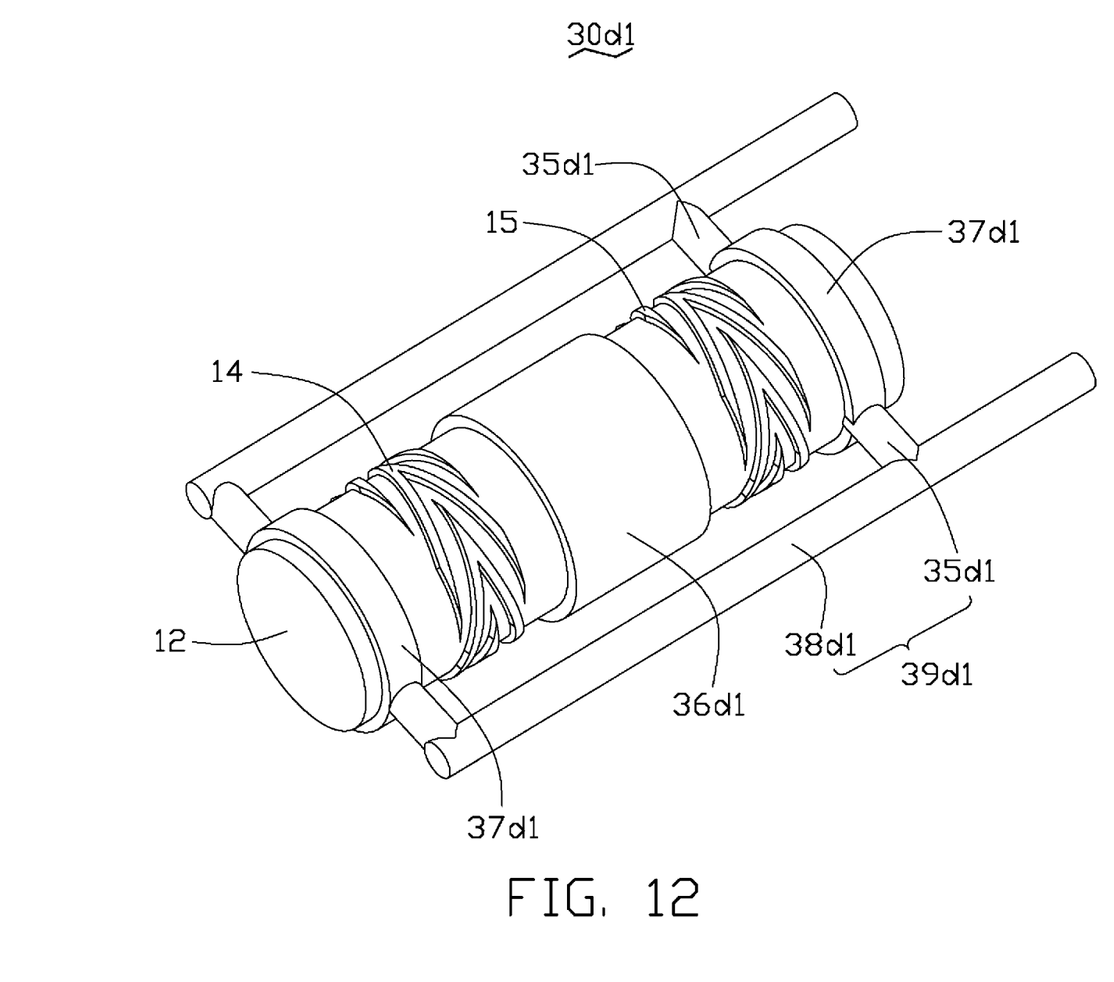
FIG. 12 is an isometric view of a substrate in accordance with the third embodiment of the present invention.

Referring to FIG. 10 to FIG. 12, methods for manufacturing the hydrodynamic bearing 100a, 100b, 100c, 100d, 200b, 200d, 300a, 300d1, 300d2 are similar to each other. In steps of manufacturing the hydrodynamic bearing 100a, 100b, 100c, 100d, 200b, 200d, 300a, 300d1 or 300d2, a substrate should first be provided. An external periphery of the substrate should be shaped to conform to an inner surface of the desired hydrodynamic bearing 100a, 100b, 100c, 100d, 200b, 200d, 300a, 300d1 or 300d2. Taking the hydrodynamic bearings 100b, 200d, 300d1 as an example, a plurality of corresponding substrates 10b, 20d, 30d1 should be used. The substrates 10b, 20d, 30d1 have similar configurations to each other. The substrates 10b, 20d, 30d1 each comprises a cylindrical body 12 and a plurality of herringbone-shaped projections 14, 15 formed on a circumferential surface of the body 12. The body 12 forms a central hole 150 in each of the bearings 100b, 200d, 300d1 and the projections 14, 15 are used to form the herringbone-shaped grooves 122, 124. Furthermore, the substrate 10b comprises annular protrusions 16b, 17b formed around the circumferential surface of the body 12. The protrusion 16b is located at a middle of the body 12 and used to form the oil retaining groove 130 of the bearing 100b. The protrusion 17b is located at an end of the body 12 and used to form the holding groove 140 of the bearing 100b. The protrusion 16b is wider in axial length than the protrusion 17b. The herringbone-shaped projections 14 are positioned between the protrusion 16b and the protrusion 17b.

The substrate 20d has annular protrusions 26d, 27d which are similar to the protrusions 16b, 17b of the substrate 10b. There are two annular protrusions 27d located at two opposite ends of the body 12. A plurality of short protrusions 25d vertically extend outwardly from circumferential surfaces of the annular protrusions 26d, 27d. The protrusions 25d on a same side are connected together by a long rod 28d. The two long rods 28d and the protrusions 25d form two bypasses 29d. The bypasses 29d are used to form the conduction channels 260d of the hydrodynamic bearing 200d.

The substrate 30d1 has annular protrusions 36d1, 37d1 which are similar to the protrusions 26d, 27d of the substrate 20d of FIG. 11. A plurality of short protrusions 35d1 vertically extends outwardly from circumferential surfaces of the annular protrusions 36$d$1, 37$d$1. The protrusions 35$d$1 on a same side are connected by a long rod 38$d$1. The two long rods 38$d$1 and the protrusions 35$d$1 form two bypasses 39$d$1. The bypasses 39$d$1 are used to form the air expelling channel 360$d$1 of the hydrodynamic bearing 300$d$1 of FIG. 8. Furthermore, the long rods 38$d$1 can extend along any direction as long as the rods 38$d$1 can reach a periphery of the hydrodynamic bearing 300$d$1 and open to the outside of the bearing 300$d$1.

Figure 13:
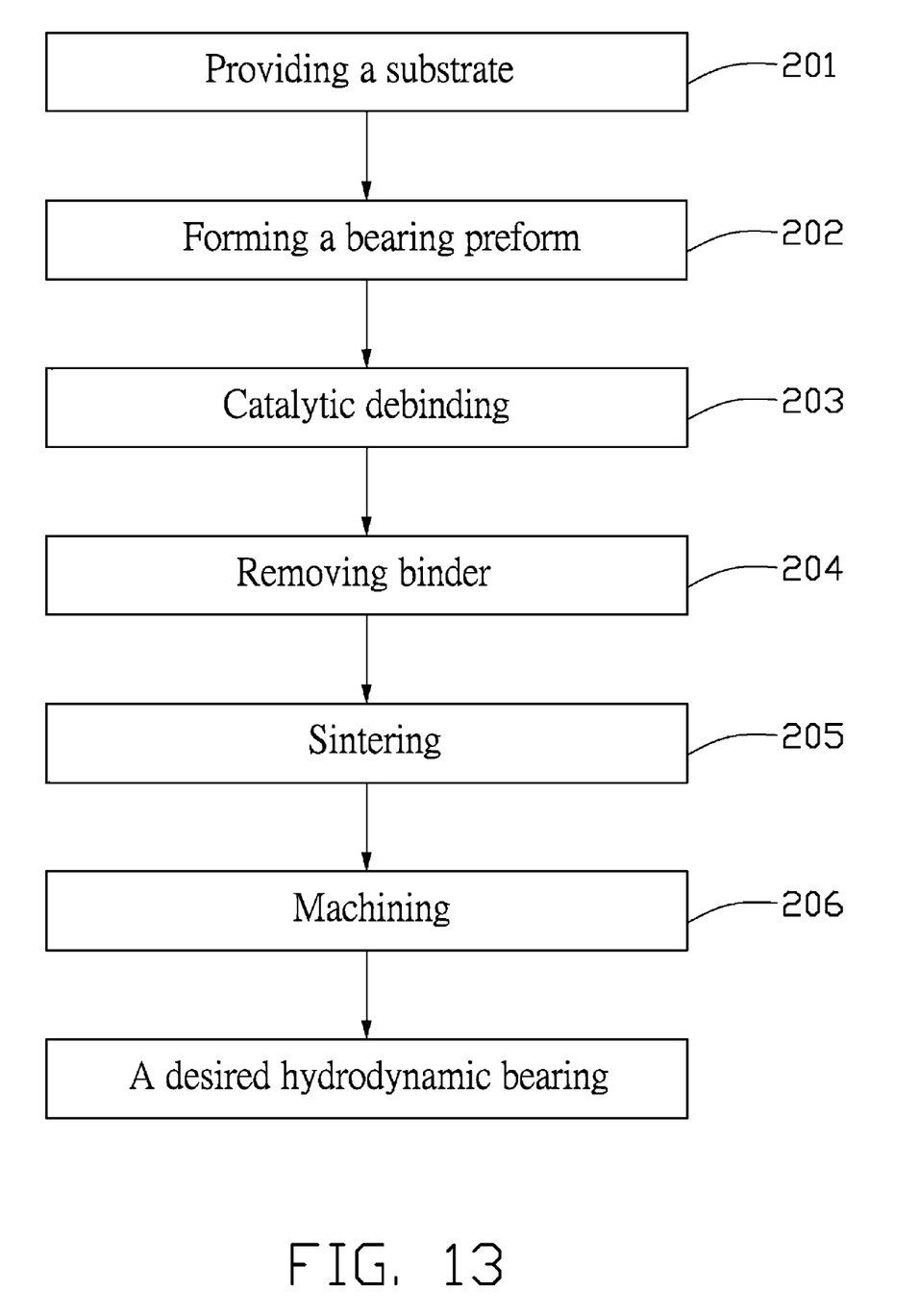
FIG. 13 is a flow chart of a method employed in manufacturing the second hydrodynamic bearing in accordance with the third embodiment of the present invention.
Figure 14:
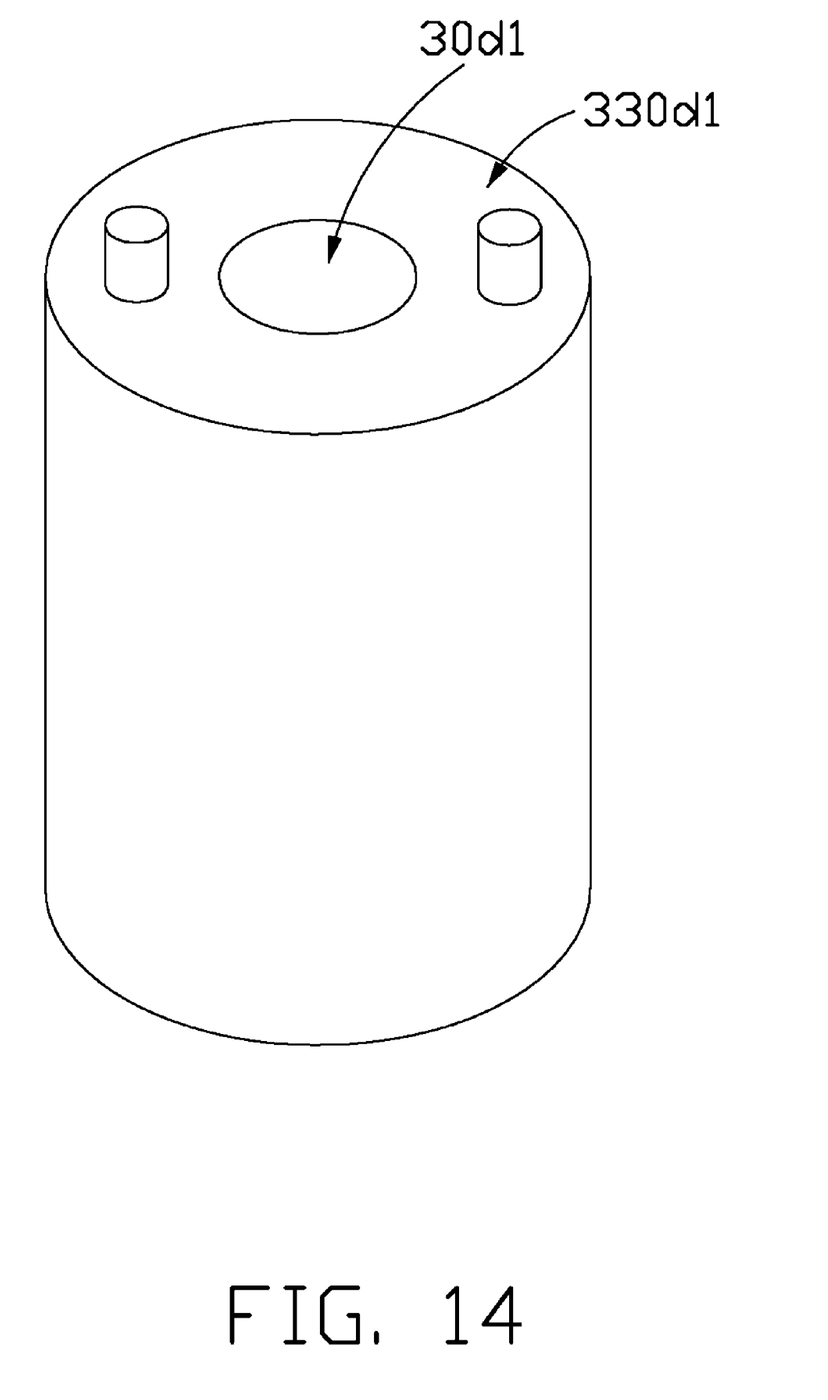
FIG. 14 is an isometric view of the substrate of FIG. 12 surrounded by a bearing preform in accordance with the third embodiment of the present invention.

Referring to FIG. 8, FIG. 12, FIG. 13 and FIG. 14, a method for manufacturing the hydrodynamic bearing 300$d$1 is described in details in following. The method can be also used to manufacture the hydrodynamic bearings 100$a$, 100$b$, 100$c$, 100$d$, 200$b$, 200$d$, 300$a$, 300$d$2 with corresponding substrates. The method for manufacturing the hydrodynamic bearing 300$d$1 in accordance with the present invention, comprises steps of:

step 201: providing the substrate 30$d$1;
step 202: placing the substrate 30$d$1 in a middle of a hollow mold, then injecting a feedstock of powder and molten binder under pressure into the mold to surround the substrate 30$d$1, thus forming a desired bearing preform 330$d$1;
step 203: separating the substrate 30$d$1 from the bearing preform 330$d$1 by means of catalytic debinding;
step 204: separating the binder from the bearing preform 330$d$1;
step 205: sintering the bearing preform 330$d$1;
step 206: performing a precision machining to the bearing preform 330$d$1, thereby forming the desired hydrodynamic bearing 300$d$1.

Figure 15:
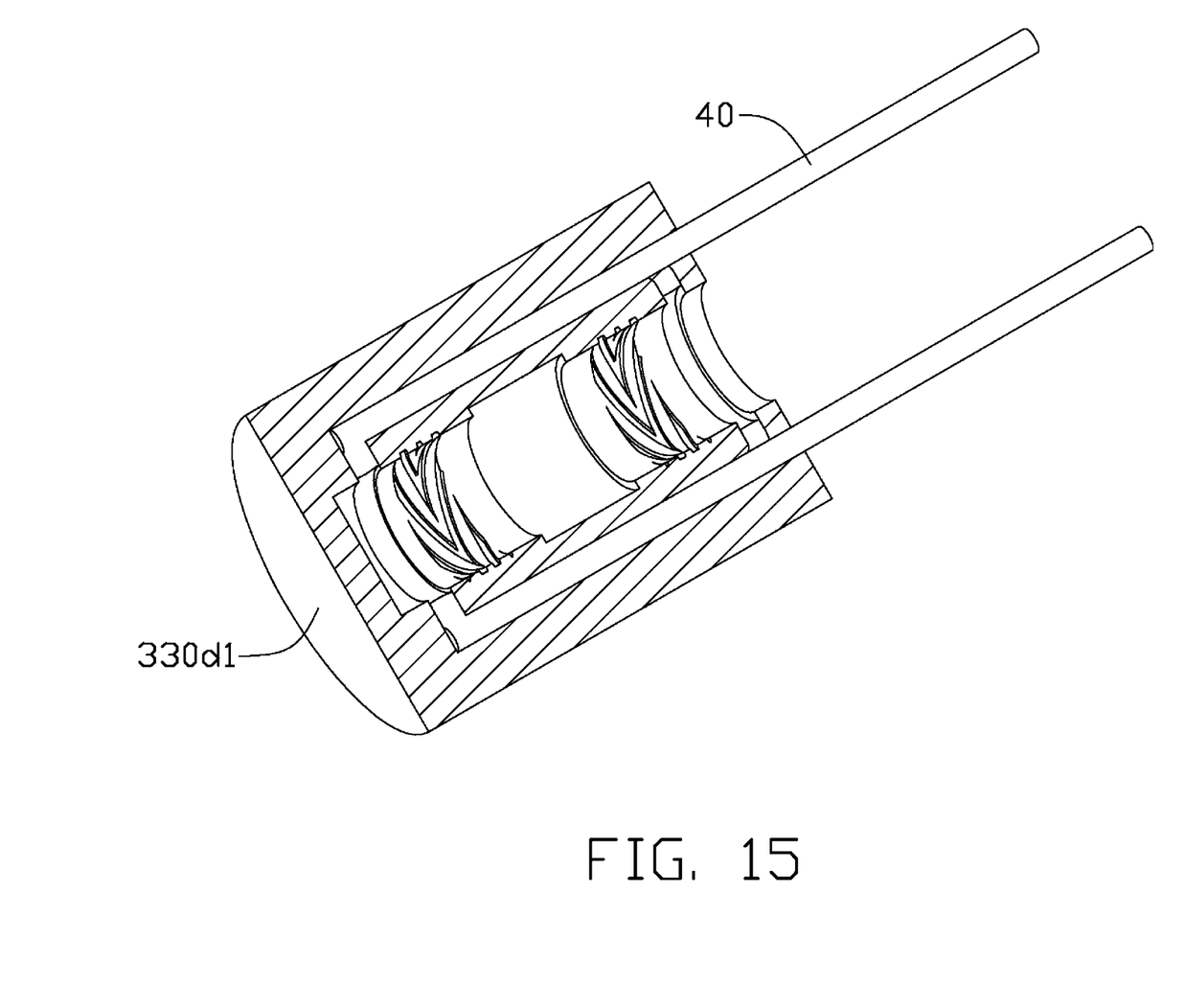
FIG. 15 is a cross-sectional, isometric view of the bearing preform and mandrils in accordance with the third embodiment of the present invention.

It is noted that, during manufacturing of the hydrodynamic bearing 300$d$1, the air expelling channels 360$d$1 can be formed by mandrils. Referring to FIG. 15, before step 202, the two long rods 38$d$1 of the substrate 30$d$1 are replaced by two mandrils 40 which are made of metal and longer than the long rods 38$d$1. The mandrils 40 are arranged at corresponding positions of the long rod 38$d$1 of the mold. When step 202 is completed, the mandrils 40 should be withdrawn from the preform 330$d$1.

Step 201 is described in detail as follows: a material for forming the substrate 30$d$1 should meet requirements for steps 202 and 203. In step 202, a melting point of the material for forming the substrate 30$d$1 should be higher than that of the molten binder of the feedstock to prevent the substrate 30$d$1 from being deformed when the substrate 30$d$1 contacts with the feedstock. On the other hand, in step 203, the material for forming the substrate 30$d$1 should be easily separable from the hydrodynamic bearing preform 330$d$1 by means of debinding. For example, polyoxymethylene (POM) can be used as a material for the substrate 30$d$1. POM has many advantages such as excellent mechanical properties (i.e. rigidity, impact resistance, low abrasion, creep resistance), outstanding chemical properties (i.e. hydrolytic stability, fatigue endurance and solvent resistance) and good thermal stability. The substrate 30$d$1 composed of POM can be made by means of injection molding, extrusion molding, blow molding, rotational molding, soldering, adhering, coating, plating, machining and so on. Injection molding can be used for making the desired substrate 30$d$1 and has steps including: (c1) melting the material used for the substrate 30$d$1; (c2) injecting the molten material into a mold (not shown) to form the substrate 30$d$1; (c3) cooling the mold and taking the substrate 30$d$1 out of the mold. Injection molding can be performed in a normal injection machine. The material for forming the substrate 30$d$1 further comprises dispersant, surfactant and additive.

Step 202 is described in details as follows: the hydrodynamic bearing preform 330$d$1 can be formed by metal injection molding (MIM) when the substrate 30$d$1 is mainly composed of POM. The feedstock generally comprises metal powder or ceramic powder. The binder of the feedstock should be one having a lower melting point than that of the substrate 30$d$1 and be one easily removable by debinding or extraction, such as polyethylene (PE). The MIM process can include the following procedures: (d1) mixing the powder and the binder to form the feedstock at a high temperature; (d2) pushing the feedstock into a mold under pressure to form a desired shape such as the hydrodynamic bearing preform 330$d$1. Injection machine used in step 201 for forming the substrate 30$d$1 can be used to manufacture the hydrodynamic bearing preform 330$d$1 in step 202. The use of MIM for manufacturing the hydrodynamic bearing preform 330$d$1 has many advantages such as high shape complexity, low cost, tight tolerances, high density, high performance etc.

Step 203 is described in detail as follows: the debinding methods available include thermal cracking debinding and catalytic debinding. Catalytic debinding is used to separate the substrate 30$d$1 from the hydrodynamic bearing preform 330$d$1 in accordance with a preferred embodiment of the present invention. Catalytic debinding comprises following processes: (e1) placing the hydrodynamic bearing preform 330$d$1 made by step 202 in a central area of a furnace for debinding; (e2) Inputting nitric acid ($HNO_3$) gas as a catalyst into the furnace at a temperature in an approximate range of between 110° C. and 140° C. that is lower than a melting point of the hydrodynamic bearing preform 330$d$1. POM reacts with $HNO_3$ and decomposes to gaseous formaldehyde in the acid and thermal atmosphere so that the substrate 30$d$1 could be quickly removed from the hydrodynamic bearing preform 330$d$1. Using catalytic cracking debinding to remove the substrate 30$d$1 takes much less time than using thermal cracking debinding. Thus the rate of debinding is increased and the hydrodynamic bearing preform 330$d$1 is given good shape retention by means of catalytic debinding; however, during the thermal cracking debinding process, the hydrodynamic bearing preform 330$d$ is inclined to break because of the difference between a coefficient of expansion of the substrate 30$d$1 and that of the hydrodynamic bearing preform 330$d$. Accordingly, catalytic cracking debinding is preferred to thermal cracking debinding in the present invention. However, thermal cracking debinding still can be used to achieve the debinding of the substrate 30$d$1 if the heating process thereof is precisely controlled. Furthermore, the gaseous formaldehyde produced during the catalytic debinding process is transferred to another part of the furnace to burn into carbon dioxide ($CO_2$) and nitrogen dioxide ($NO_2$), which are less toxic than the formaldehyde. As a result, the bearing 300$d$1 can be produced with a high degree of accuracy in its size and concentricity.

Step 204 is described in details as follows: after the substrate 30$d$1 is separated from the bearing preform 330$d$1, the binder can be removed out from the bearing preform 330$d$1 by means of thermal debinding or extraction.

Step 205 is described in details as follows: after the binder is separated from the bearing preform 330$d$1, the bearing preform 330$d$1 consequently is weaken. Therefore, it is necessary to sinter the bearing preform 330$d$1 in place. The sintering process can be performed in a vacuum, or in an oxygen and/or nitrogen atmosphere.

Step 206 is described in details as follows: generally, the hydrodynamic bearing preform 330$d$1 is inclined to shrink during sintering. In order to give the hydrodynamic bearing preform 330$d$1 a high level of precision in its manufacture, it is necessary to machine the bearing preform 330*d*1 using methods such as broaching, grinding, milling, polishing, and so on.

Furthermore, the method in accordance with the preferred embodiment of the present invention can be used for manufacturing other kinds of hydrodynamic bearings or shaft with differently shaped grooves. When using the method to make a desired shaft with hydrodynamic pressure generating grooves, the oil retaining groove, the holding groove, the conduction channel and the air expelling channel, an internal surface of the substrate should correspond in shape to the circumferential surface of the desired shaft.

Compared with the related method for manufacturing the hydrodynamic bearing, the hydrodynamic bearing 300*d*1 is configured (i.e., structured and arranged) for mass-production by the method in accordance with the preferred embodiment of the present invention. Also, the hydrodynamic bearing 300*d*1 manufactured by the present method has good lubricant-retention.

It is to be understood that the above-described methods are intended to illustrate rather than limit the invention. Variations may be made to the methods without departing from the spirit of the invention. Accordingly, it is appropriate that the appended claims be construed broadly and in a manner consistent with the scope of the invention.

What is claimed is:

1. A method for manufacturing a hydrodynamic bearing with hydrodynamic pressure generating grooves, the method comprising:
   providing a substrate with a first annular protrusion and a plurality of projections formed on a periphery of the substrate, the projections located at a side of the first annular protrusion;
   placing the substrate in a middle of a hollow mold, then injecting a feedstock of powder and molten binder under pressure into the mold to surround the substrate, thus forming a desired bearing preform;
   separating the substrate from the bearing preform by means of catalytic debinding;
   separating the molten binder from the bearing preform; and
   sintering the bearing preform to thereby form the hydrodynamic bearing.

2. The method as claimed in claim 1, wherein the substrate comprises a cylindrical body, the projections are herringbone-shaped and are used to form the hydrodynamic pressure generating grooves for providing hydrodynamic pressure, and the first annular protrusion is used to form an oil retaining groove in an inner circumferential surface of the hydrodynamic bearing.

3. The method as claimed in claim 2, wherein a second annular protrusion is formed beside the projections on the substrate and is used to form a holding groove in the inner circumferential surface of the hydrodynamic bearing.

4. The method as claimed in claim 3, wherein a plurality of short protrusions extend outwardly from circumferential surfaces of the annular protrusions, at least a long rod connects the short protrusions together to form a bypass, and the bypass is used to form an air expelling channel for the hydrodynamic bearing.

5. The method as claimed in claim 4, wherein the at least a long rod is long enough to reach a periphery of the hydrodynamic bearing.

6. The method as claimed in claim 3, wherein the second annular protrusion is narrower in axial length than the first annular protrusion.

7. The method as claimed in claim 3, wherein a third annular protrusion is formed on another end opposing the second annular protrusion in the substrate, and the third annular protrusion has an identical configuration to the second annular protrusion and is used to form another holding groove in the inner circumferential surface of the hydrodynamic bearing.

8. The method as claimed in claim 3, wherein a plurality of short protrusions extend outwardly from circumferential surfaces of the annular protrusions, at least a long rod connects the short protrusions together to form a bypass, and the bypass is used to form a flow channel for the hydrodynamic bearing.

9. The method as claimed in claim 1, wherein polyethylene (PE) is used as a material for the molten binder of the feedstock.

10. The method as claimed in claim 9, wherein the molten binder of the feedstock is removed by debinding or extraction.

11. The method as claimed in claim 1, wherein polyoxymethylene (POM) is used as a material for the substrate.

12. The method as claimed in claim 1, wherein in catalytic debinding, nitric acid ($HNO_3$) gas is used as a catalyst.

13. The method as claimed in claim 1, wherein gaseous formaldehyde produced during the catalytic debinding process is transferred to burn into carbon dioxide ($CO_2$) and nitrogen dioxide ($NO_2$).

14. The method as claimed in claim 1, wherein a precision machining operation is performed on the bearing preform after the sintering process.

15. A method for manufacturing a hydrodynamic bearing with hydrodynamic pressure generating grooves, the method comprising:
   providing a substrate with a first annular protrusion and a plurality of projections formed on a periphery thereof, the projections being on a side of the first annular protrusion;
   placing the substrate in a middle of a hollow mold, a mandril being arranged in the mold and in connection with the substrate, then injecting a feedstock of powder and molten binder under pressure into the mold to surround the substrate and the mandril, thus forming a desired bearing preform;
   removing the mandril from the mold;
   separating the substrate from the bearing preform by means of a process chosen from the group including catalytic debinding and thermal debinding;
   separating the molten binder from the bearing preform; and
   sintering the bearing preform to thereby form the hydrodynamic bearing.

16. The method as claimed in claim 15, wherein the substrate comprises a cylindrical body, the projections being herringbone-shaped are used to form the hydrodynamic pressure generating grooves for providing hydrodynamic pressure, and the first annular protrusion is used to form an oil retaining groove in an inner circumferential surface of the hydrodynamic bearing.

17. The method as claimed in claim 16, wherein in the catalytic debinding process, nitric acid ($HNO_3$) gas is used as a catalyst.

18. The method as claimed in claim 17, wherein gaseous formaldehyde produced during the catalytic debinding process is transferred to burn into carbon dioxide ($CO_2$) and nitrogen dioxide ($NO_2$).

19. The method as claimed in claim 16, wherein the mandril is used for forming an air expelling channel in the hydrodynamic bearing.

20. The method as claimed in claim 16, wherein polyoxymethylene (POM) is used as a material for the substrate.

* * * * *